US011089880B1

(12) United States Patent
Suhre et al.

(10) Patent No.: US 11,089,880 B1
(45) Date of Patent: Aug. 17, 2021

(54) UPHOLSTERY COVER RETENTION ASSEMBLY

(71) Applicant: B/E Aerospace, Inc., Winston-Salem, NC (US)

(72) Inventors: Ryan J. Suhre, Winston-Salem, NC (US); Stephen A. Puglisi, Greensboro, NC (US); Jordan G. Jett, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 52 days.

(21) Appl. No.: 16/680,097

(22) Filed: Nov. 11, 2019

(51) Int. Cl.
*A47C 31/02* (2006.01)
*B64D 11/00* (2006.01)
*B64D 11/06* (2006.01)

(52) U.S. Cl.
CPC ...... *A47C 31/023* (2013.01); *B64D 11/00151* (2014.12); *B64D 11/0647* (2014.12)

(58) Field of Classification Search
CPC ... A47C 31/023; A47C 7/386; B64D 11/0647; B64D 11/00151; B60N 2/5825; B60R 11/0235; B60R 2011/0017
See application file for complete search history.

(56) References Cited

U.S. PATENT DOCUMENTS

| | | | |
|---|---|---|---|
| 3,981,534 A | 9/1976 | Wilton | |
| 5,658,046 A | 8/1997 | Rus | |
| 6,905,167 B2 * | 6/2005 | Jost | B60N 2/5891 297/188.04 |
| 7,665,804 B1 * | 2/2010 | Jeffrey | G09F 21/049 297/220 |
| 8,104,833 B2 * | 1/2012 | Koontz, II | B60N 2/879 297/220 |

(Continued)

FOREIGN PATENT DOCUMENTS

| | | |
|---|---|---|
| DE | 3535353 A1 | 4/1986 |
| DE | 3618057 A1 | 12/1986 |

(Continued)

OTHER PUBLICATIONS

Extended Search Report for European Application No. 20206974 dated Mar. 21, 2021, 7 pages.

*Primary Examiner* — David R Dunn
*Assistant Examiner* — Tania Abraham
(74) *Attorney, Agent, or Firm* — Suiter Swantz pc llo

(57) ABSTRACT

An upholstery cover retention assembly is disclosed. In embodiments, the upholstery cover retention assembly includes an upholstered article including an upholstered surface, a bezel including a bezel lip proximate to the upholstered article, and a retention flange disposed on a peripheral surface of the upholstered article. In embodiments, the upholstery cover retention assembly further includes a dress cover assembly including a dress cover configured to at least partially cover the upholstered surface of the upholstered article, and an assembled edge configured to be disposed within a groove formed between the peripheral surface of the upholstered article and the bezel. In embodiments, assembled edge is configured to be secured within the groove by engaging a lower engagement surface of the retention flange and a lower surface of the bezel lip with the assembled edge.

20 Claims, 13 Drawing Sheets

(56) References Cited

U.S. PATENT DOCUMENTS

| | | | |
|---|---|---|---|
| 8,292,364 B2 * | 10/2012 | Liu | B60N 2/806 297/217.3 |
| 2011/0298250 A1 | 12/2011 | Line et al. | |
| 2015/0283929 A1 | 10/2015 | Velasco | |
| 2015/0284093 A1 | 10/2015 | Velasco | |
| 2017/0305316 A1 | 10/2017 | Lafferty et al. | |

FOREIGN PATENT DOCUMENTS

| | | |
|---|---|---|
| DE | 3831636 C1 | 9/1989 |
| DE | 102008033468 A1 | 2/2009 |
| EP | 03445848 B1 | 8/1992 |
| WO | 2011094668 A2 | 8/2011 |

\* cited by examiner

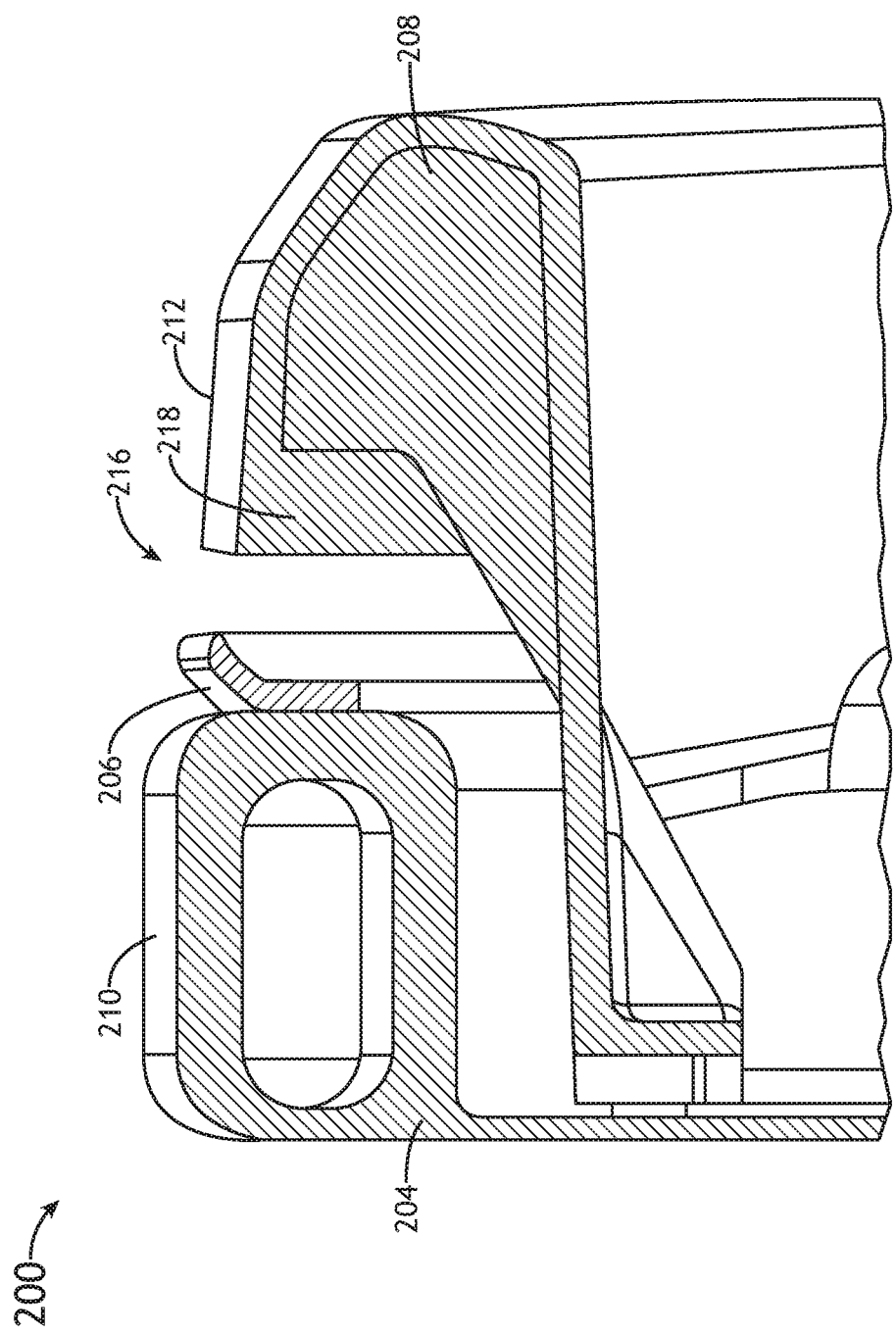

UPHOLSTERY COVER RETENTION ASSEMBLY

BACKGROUND

Aircraft passenger seats take up large amounts of space within an aircraft, and account for a significant proportion of the overall weight of the aircraft. Thus, there is a need to reduce the overall weight and complexity of aircraft passenger seats. Seating upholstery has a large impact of the weight, cost, and comfort of aircraft passenger seats. Conventional seating upholstery of an aircraft passenger seat includes a dress cover for providing a soft, comfortable, and aesthetically pleasing seat for passengers. Due to the large volumes of passengers serviced by a commercial aircraft, a majority of seating upholstery must be removable for cleaning and maintenance of the aircraft passenger seats. However, conventional upholstery cover retention assemblies are complex to design and fabricate, and lead to unnecessary added cost and weight of the aircraft. Furthermore, conventional upholstery cover retention assemblies are complicated to install and remove from the seats, further increasing maintenance and personnel costs. Therefore, there exists a need in the art which address one or more of the shortfalls of previous approaches identified above.

SUMMARY

An upholstery cover retention assembly is disclosed. In embodiments, the upholstery cover retention assembly includes an upholstered article including an upholstered surface, a bezel including a bezel lip proximate to the upholstered article, and a retention flange disposed on a peripheral surface of the upholstered article. In embodiments, the upholstery cover retention assembly further includes a dress cover assembly, the dress cover assembly including a dress cover configured to at least partially cover the upholstered surface of the upholstered article, and an assembled edge configured to be disposed within a groove formed between the peripheral surface of the upholstered article and the bezel. In embodiments, the assembled edge includes a securement portion and a catch portion, wherein the assembled edge is configured to be secured within the groove when an outside force is applied to the dress cover assembly by engaging a lower engagement surface of the retention flange and a lower surface of the bezel lip with the assembled edge.

In some embodiments of the upholstery cover retention assembly, the assembled edge is configured to engage the lower engagement surface of the retention flange with the catch portion of the assembled edge.

In some embodiments of the upholstery cover retention assembly, the assembled edge is configured to engage the lower surface of the bezel lip with the securement portion of the assembled edge.

In some embodiments of the upholstery cover retention assembly, the assembled edge is configured to engage the lower surface of the bezel lip with the securement portion of the assembled edge in response to engagement of the lower engagement surface of the retention flange with the catch portion of the assembled edge.

In some embodiments of the upholstery cover retention assembly, the outside force causes the assembled edge to engage the lower surface of the bezel lip such that the dress cover of the dress cover assembly is substantially parallel with the lower surface of the bezel lip.

In some embodiments of the upholstery cover retention assembly, the bezel lip extends from the bezel towards the upholstered article, and wherein the retention flange extends from the peripheral surface towards the bezel.

In some embodiments of the upholstery cover retention assembly, the assembled edge is configured to resist outside forces in order to retain the dress cover assembly within the groove.

In some embodiments of the upholstery cover retention assembly, the assembled edge includes an edge attachment article secured along at least a portion of a perimeter of the dress cover.

In some embodiments of the upholstery cover retention assembly, the securement portion includes a distal edge of the assembled edge, and the catch portion includes a proximate edge of the edge attachment article.

In some embodiments of the upholstery cover retention assembly, the upholstered article is fabricated to include the retention flange such that the retention flange includes a component of the upholstered article.

In some embodiments of the upholstery cover retention assembly, the upholstered article and retention flange are fabricated by at least one of a thermoforming process or an extrusion process.

In some embodiments of the upholstery cover retention assembly, the upholstered article includes a seatback of an aircraft seat.

In some embodiments of the upholstery cover retention assembly, the bezel includes a display monitor bezel of an aircraft seat.

In some embodiments of the upholstery cover retention assembly, the retention flange includes a curved convex retention flange.

An upholstery cover retention assembly is disclosed. In embodiments, the upholstery cover retention assembly includes an upholstered article including an upholstered surface. The upholstery cover retention assembly may further include a bezel including a bezel lip proximate to the upholstered article, the bezel spaced from the upholstered article forming a groove between the upholstered article and the bezel, wherein the groove is configured to receive an assembled edge of a dress cover assembly. In embodiments, the upholstery cover retention assembly further includes a retention flange disposed on a peripheral surface of the upholstered article, wherein a lower engagement surface of the retention flange is configured to engage a catch portion of the assembled edge and a lower surface of the bezel lip is configured to engage a securement portion of the assembled edge in order to retain the assembled edge within the groove when an outside force is applied to the dress cover assembly.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 4B illustrates a perspective view of an upholstery cover retention assembly, in accordance with one or more embodiments of the present disclosure.

DETAILED DESCRIPTION

Figure 1A:
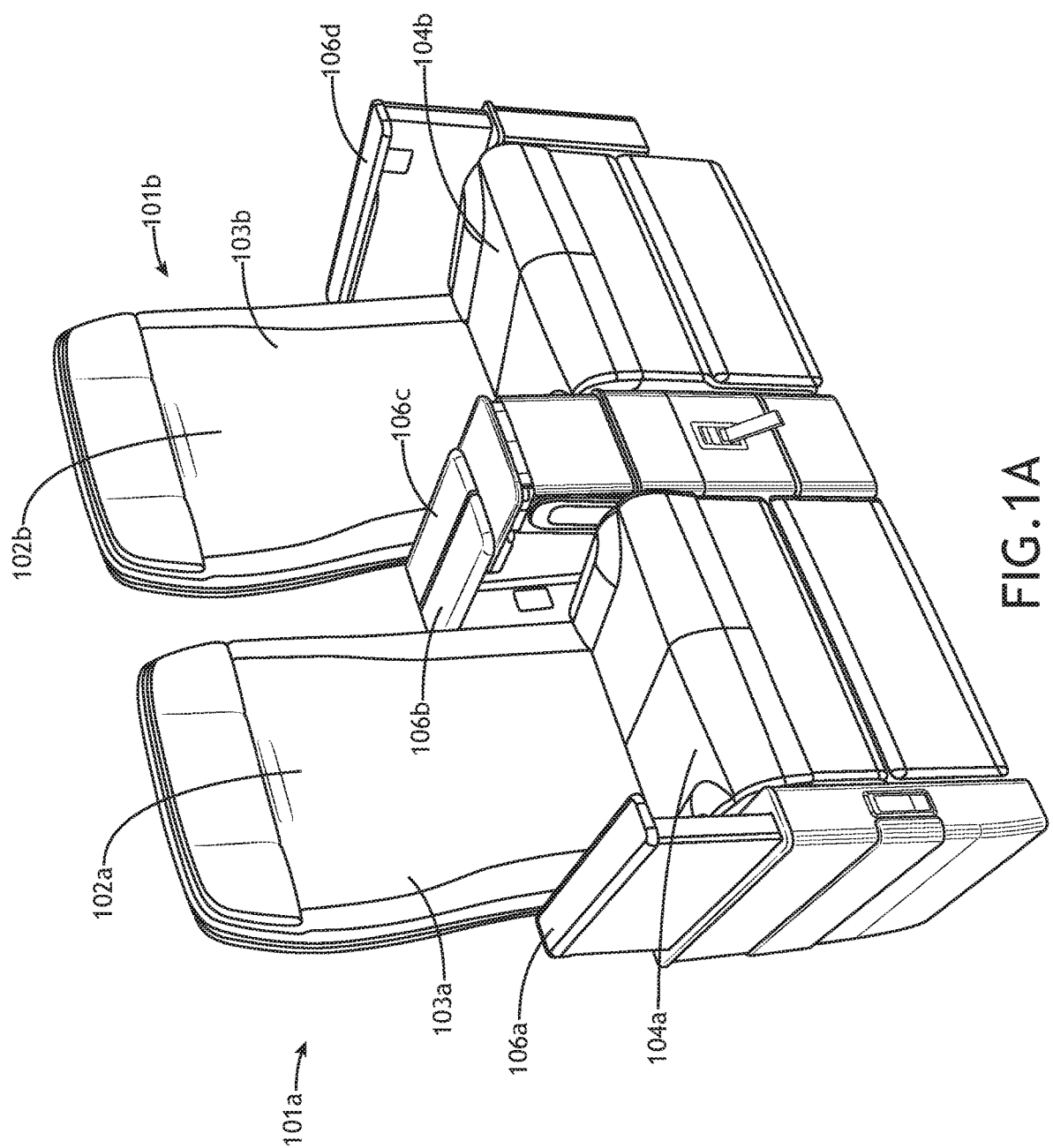
FIG. 1A illustrates a front perspective view of aircraft passenger seats, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Conventional seating upholstery of an aircraft passenger seat includes a dress cover for providing a soft, comfortable, and aesthetically pleasing seat for aircraft passengers. Due to the large volumes of passengers serviced by a commercial aircraft, a majority of seating upholstery must be removable for cleaning and maintenance of the aircraft passenger seats. However, conventional upholstery cover retention assemblies are complex to design and fabricate, and lead to unnecessary added cost and weight of the aircraft. Furthermore, conventional upholstery cover retention assemblies for aircraft passenger seats are complicated to fit and remove from the seats, further increasing maintenance and personnel costs.

Accordingly, embodiments of the present disclosure are directed to an upholstery cover retention assembly configured to address one or more of the shortfalls of previous approaches identified above. Embodiments of the present disclosure are directed to a retention flange of an upholstered article configured to engage an assembled edge of a dress cover assembly in order to removably secure the dress cover assembly over the upholstered article. Additional embodiments of the present disclosure are directed to a bezel lip of a bezel disposed proximate to an upholstered article, wherein the bezel lip is configured to engage the assembled edge of the dress cover assembly in order to removably secure the dress cover assembly within a groove formed between the bezel and the upholstered article.

It is contemplated herein that embodiments of the present disclosure may provide a simplified, streamlined upholstery cover retention assembly which will lower the cost and weight of aircraft passenger seats. It is further contemplated herein that the upholstery cover retention assembly of the present disclosure may securely fasten dress cover assemblies to aircraft passenger seats, while simplifying the process to install and remove the dress cover assemblies for cleaning and maintenance.

Reference will now be made in detail to the subject matter disclosed, which is illustrated in the accompanying drawings.

FIG. 1A illustrates a front perspective view of aircraft passenger seats 101a, 101b, in accordance with one or more embodiments of the present disclosure. An aircraft passenger seat 101a may include, but is not limited to, a seatback 103a, a seat structure 104b, and one or more armrests 106a, 106b.

In many aircraft settings, aircraft passenger seats 101a, 101b are arranged in rows, as shown in FIG. 1A. For example, a first aircraft passenger seat 101a may be positioned adjacent to a second aircraft passenger seat 101b. In embodiments, an aircraft passenger seat 101a, 101b may include a seatback 103a, 103b configured to support an upper body of an aircraft passenger, and a seat structure 109a, 109b upon which the aircraft passenger may be seated. The aircraft passenger seat 101a, 101b may further include armrests 106a, 106b, 106c, 106d on lateral sides of each aircraft passenger seat 101a, 101b. The armrests 106a, 106b, 106c, 106d may be configured to separate adjacent aircraft seats 101a, 101b, as well as separate aircraft seats 101a, 101b from an aisle or an outer wall of the aircraft.

In embodiments, an aircraft passenger seat 101 may include one or more upholstered articles including one or more upholstered surfaces at least partially covered by a dress cover 102. For example, as shown in FIG. 1A, the aircraft passenger seat 101a may include one or more dress covers 102a which cover at least a portion of the seatback 103a and the seat structure 104a. In this example, the seatback 103a and the seat structure 104a may be regarded as upholstered articles, with upholstered surfaces at least partially covered by the one or more dress covers 102a.

Figure 1B:
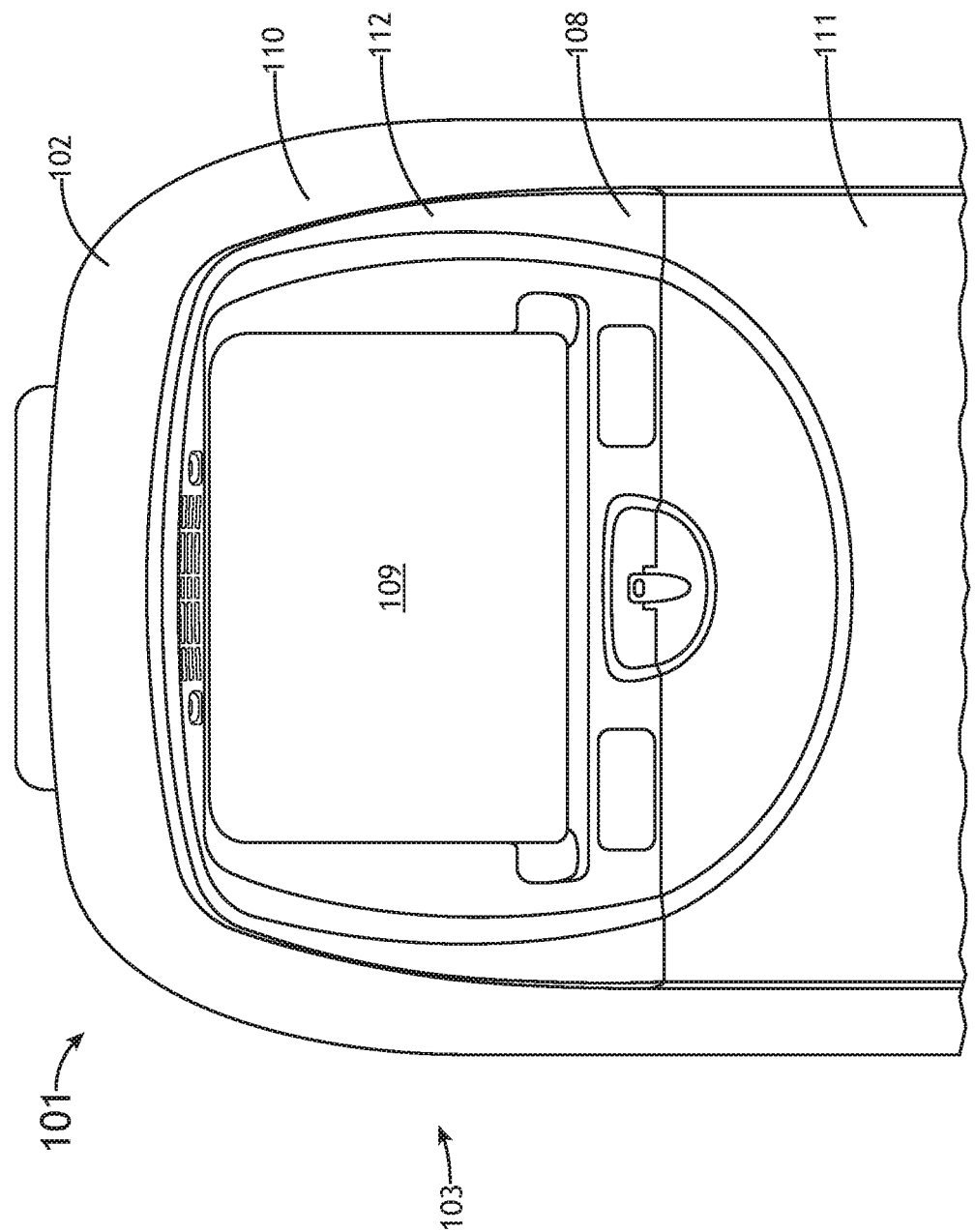
FIG. 1B illustrates a rear elevation view of an aircraft passenger seat, in accordance with one or more embodiments of the present disclosure.

FIG. 1B illustrates a rear elevation view of an aircraft passenger seat 101, in accordance with one or more embodiments of the present disclosure.

As shown in FIG. 1B, a rear seatback surface of the seatback 103 may include, but is not limited to, a display monitor bezel 108, a display monitor 109, and a tray table 111. In embodiments with a display monitor 109, the display monitor bezel 108 may be configured to at least partially surround the display monitor 109. The display monitor bezel 108 may be fabricated from any material known in the art including, but not limited to, plastics, metals, and the like. The display monitor bezel 108 may include a tray table locking assembly disposed within the display monitor bezel 108, wherein the tray table locking assembly is configured to be actuated in order to lock the tray table 111 in a "closed" position, and release the tray table 111 into an "open" position.

As shown in FIG. 1B, an aircraft passenger seat 101 may include one or more interfaces in which an upholstered surface at least partially covered by a dress cover 102 meets and/or transitions into a bezel surface. In this regard, one or more upholstered articles with one or more upholstered surfaces may be disposed proximate to one or more bezels (e.g., display monitor bezel 108) with one or more un-upholstered surfaces. For example, as shown in FIG. 1B, the seatback 103 may include an upholstered article with one or more upholstered surfaces 110 covered by a dress cover 102. The one or more upholstered surfaces 110 may be disposed proximate to the display monitor bezel 108 around a perimeter of the display monitor bezel 108, such that the one or more upholstered surfaces 110 interface with one or more un-upholstered bezel surfaces 112 at the perimeter of the display monitor bezel 108.

While much of the present disclosure shows and describes an upholstery cover retention assembly in the context of an upholstered seatback surface (e.g., upholstered surface 110) interfacing with a display monitor bezel (e.g., display monitor bezel 108), this is not to be regarded as a limitation of the present disclosure, unless noted otherwise herein. In this regard, the upholstery cover retention assembly may be applied in the context of any upholstered surface 110 including, but not limited to, an upholstered surface 110 of a seatback 103, an upholstered surface 110 of a seat structure 104, an upholstered surface of an armrest 106, and the like. Similarly, the bezel of the upholstery cover retention assembly may is not limited to a display monitor bezel 108, and may include any bezel including non-upholstered surfaces known in the art. For example, the bezel of the present disclosure may include, but is not limited to, a display monitor bezel 108, a tray table bezel, a bezel configured to secure a peripheral edge of a dress cover 102, and the like.

Figure 2A:
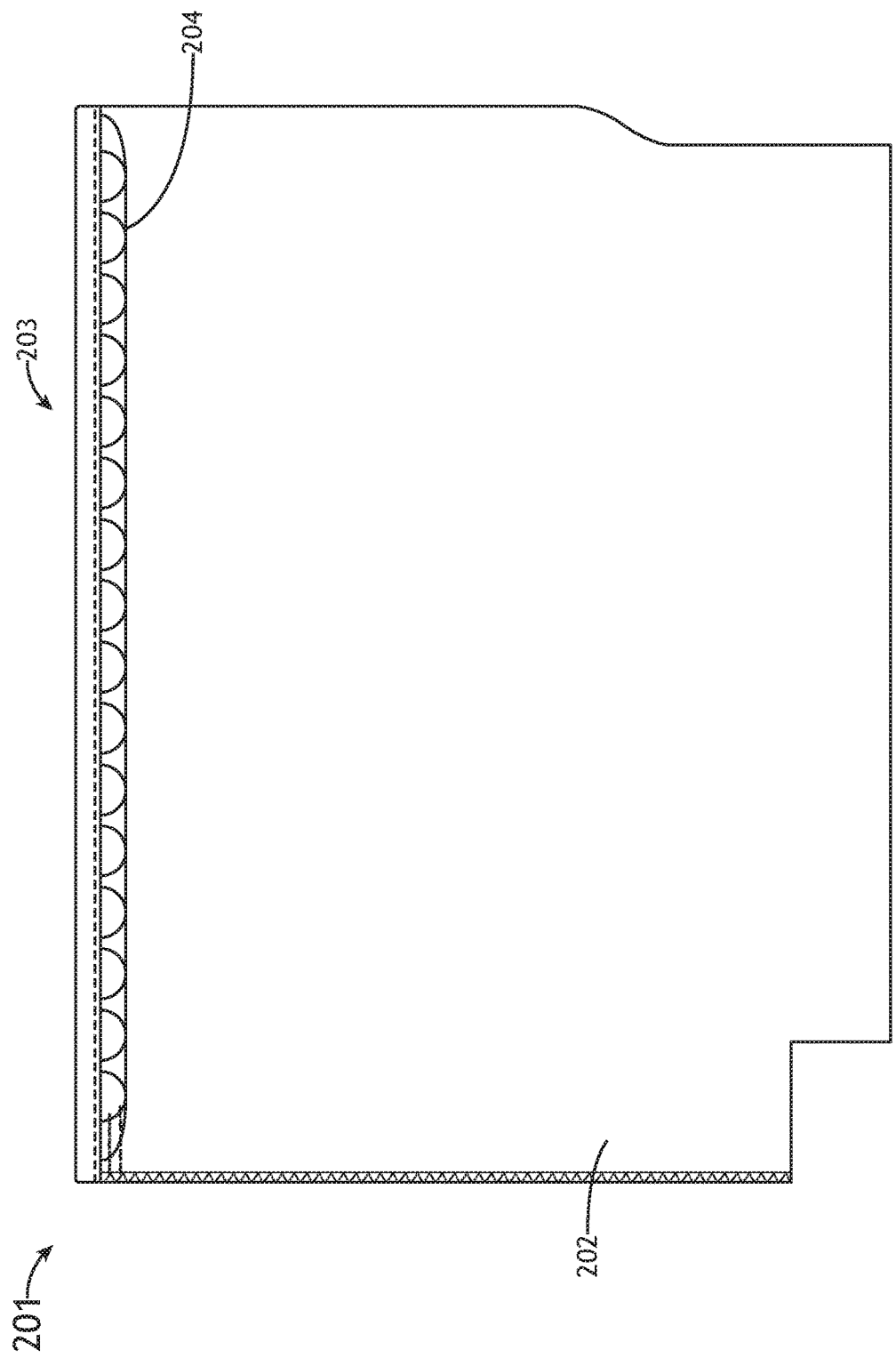
FIG. 2A illustrates a dress cover assembly of an upholstery cover retention assembly, in accordance with one or more embodiments of the present disclosure.

FIG. 2A illustrates a dress cover assembly 201 of an upholstery cover retention assembly, in accordance with one or more embodiments of the present disclosure. The dress cover assembly 201 may include, but is not limited to, a dress cover 202 and an edge attachment article 204.

In embodiments, the dress cover 202 may be configured to at least partially cover an upholstered surface (e.g., upholstered surface 110) of an upholstered article, as shown in FIGS. 1A-1B. The dress cover 202 may be fabricated with any material known in the art including, but not limited to, cloth fabric, natural leather, reconstituted leather, faux leather, padding material, synthetic materials, and the like. In this regard, the dress cover 202 may include a flexible upholstery material configured to conform to and/or partially cover an upholstered surface 110 of an upholstered article.

In embodiments, the dress cover assembly 201 may include an edge attachment article 204 configured to be secured along at least a portion of a perimeter of the dress cover 202. For example, as shown in FIG. 2A, the edge attachment article 204 may be secured to the dress cover 202 along one side of the perimeter of the dress cover 202 in order to form an assembled edge 203.

Figure 2B:
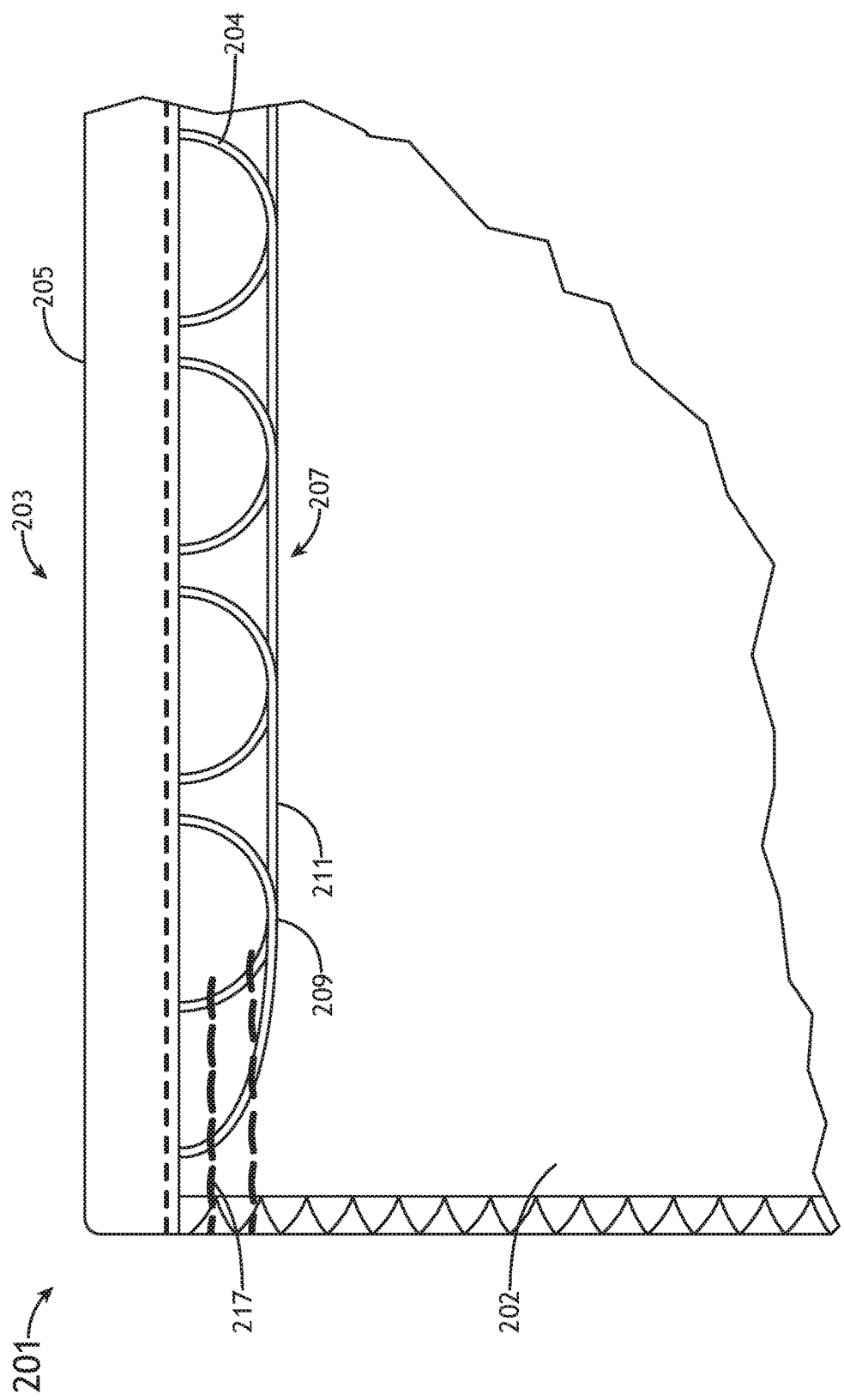
FIG. 2B illustrates an assembled edge of a dress cover assembly of an upholstery cover retention assembly, in accordance with one or more embodiments of the present disclosure.

FIG. 2B illustrates an assembled edge 203 of a dress cover assembly 201 of an upholstery cover retention assembly, in accordance with one or more embodiments of the present disclosure.

In embodiments, the edge attachment article 204 may include a rigid or semi-rigid structure which is configured for elastic deformation without fracture while installing and removing the dress cover assembly 201 from an aircraft passenger seat 101. For example, as shown in FIG. 2B, the edge attachment article 204 may include a wire formed into a continuous series of loops 209 joined by linking portions 211. The edge attachment article 204 may be formed from any material known in the art including, but not limited to, piano wire, spring tempered stainless steel, nylon microfilaments, acrylonitrile butadiene styrene (ABS) microfilaments, and the like. Additionally, the edge attachment article 204 may be formed from a material which may be able to be repeatedly washed/cleaned without fracture, breaking, or corrosion.

In embodiments, the edge attachment article 204 may be fastened/secured to the dress cover 202 in order to form an elastically deformable, semi-rigid assembled edge 203 of the dress cover assembly 201. The edge attachment article 204 may be fastened/secured to the dress cover 202 using any techniques known in the art including, but not limited to, stitching 217, adhesives, and the like. In embodiments, the assembled edge 203 of the dress cover assembly 201 may include a securement portion 205 and a catch portion 207. In embodiments, the securement portion 205 may include a distal edge of the assembled edge 203, and the catch portion 207 may include a proximate edge of the edge attachment article 204. In this regard, in some embodiments, the securement portion 205 may include a distal edge of the edge attachment article 204 within the assembled edge 203, whereas the catch portion 207 may include a proximate edge of the edge attachment article 204 within the assembled edge 203.

In embodiments, the edge attachment article 204 and the assembled edge 203 of the dress cover assembly 201 are configured to facilitate efficient installation and removal of the dress cover assembly 201 within an aircraft passenger seat 101. The dress cover assembly 201 including the edge attachment article 204 and assembled edge 203 is described in further detail in U.S. Patent Application No. 2015/0283929A1 filed Apr. 2, 2015, entitled METHOD AND ARTICLES FOR ATTACHING UPHOLSTERY COVERS AND OTHER FLEXIBLE MATERIAL, which is incorporated herein by reference in the entirety.

Figure 3A:
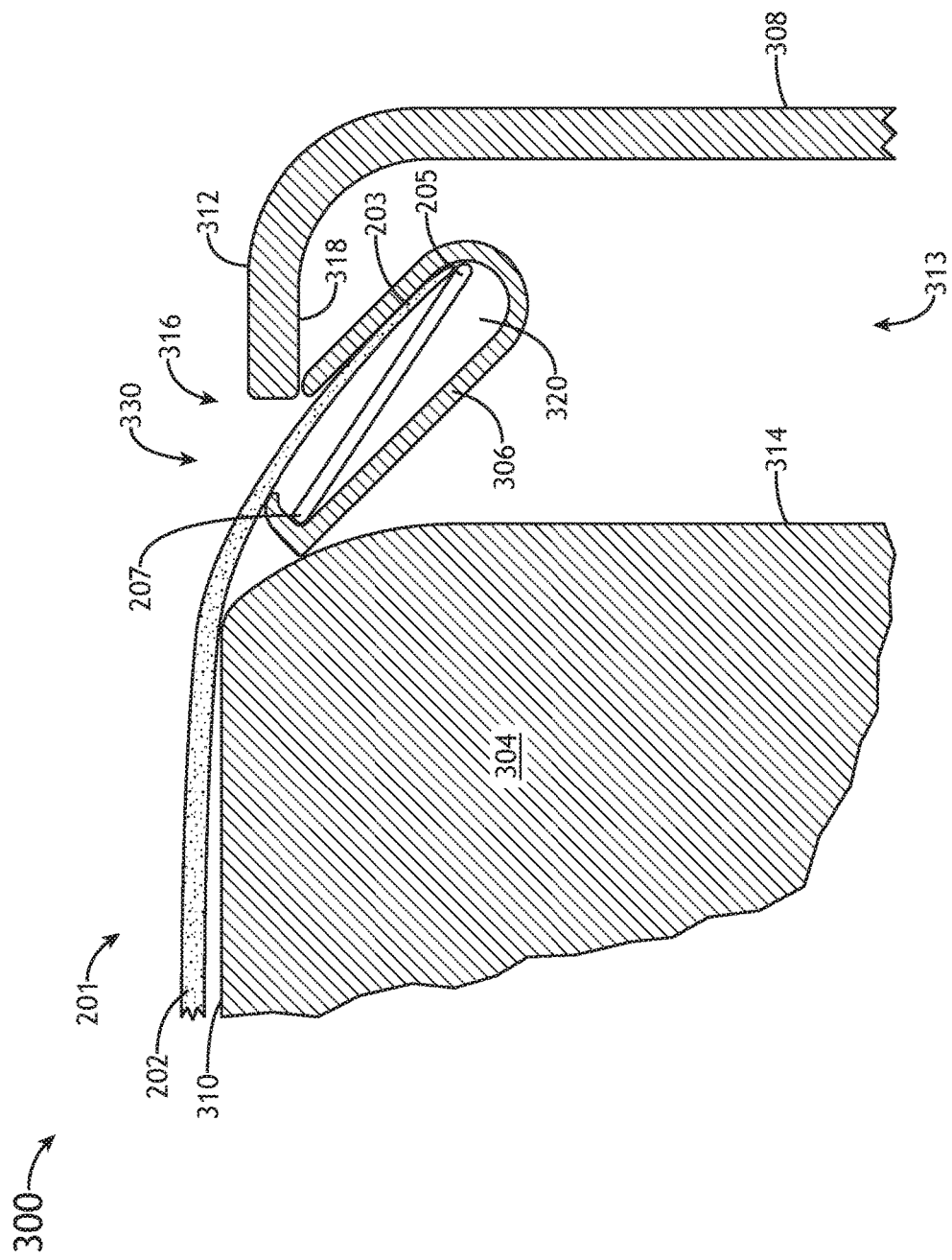
FIG. 3A illustrates a cross-sectional view of an upholstery cover retention assembly.

FIG. 3A illustrates a cross-sectional view of an upholstery cover retention assembly 300. In particular, FIG. 3A may illustrate a cross-sectional view of an interface between an upholstered surface 110 and a bezel surface 112 of an aircraft passenger seat 101, according to a conventional upholstery cover retention assembly 300.

It is noted herein that the upholstery cover retention assembly 300 is provided herein as an example of a conventional upholstery cover retention assembly. In this regard, it is contemplated herein that a brief description of the upholstery cover retention assembly 300 may provide a baseline against which attendant advantages of the upholstery cover retention assembly of the present disclosure may be compared.

The upholstery cover retention assembly 300 may include an upholstered article 304, a channel structure 306, and a bezel 308. The upholstered article 304 may be disposed proximate and/or adjacent to a bezel 308 including a bezel surface 312 and a bezel lip 316. The upholstered article 304 and the bezel 308 may be disposed proximate and/or adjacent to one another such that a groove 313 is formed between the upholstered article 304 and the bezel 308. The channel structure 306 may be coupled to a peripheral surface 314 of the upholstered article 304 within the groove 313. The channel structure 306 may be fabricated separately from the upholstered article and/or the bezel 308. In this regard, the channel structure 306 may be coupled to the peripheral surface 314 of the upholstered article 304 after fabrication of the upholstered article 304. The channel structure 306 may be further understood with reference to FIGS. 3B and 3C.

Figure 3B:
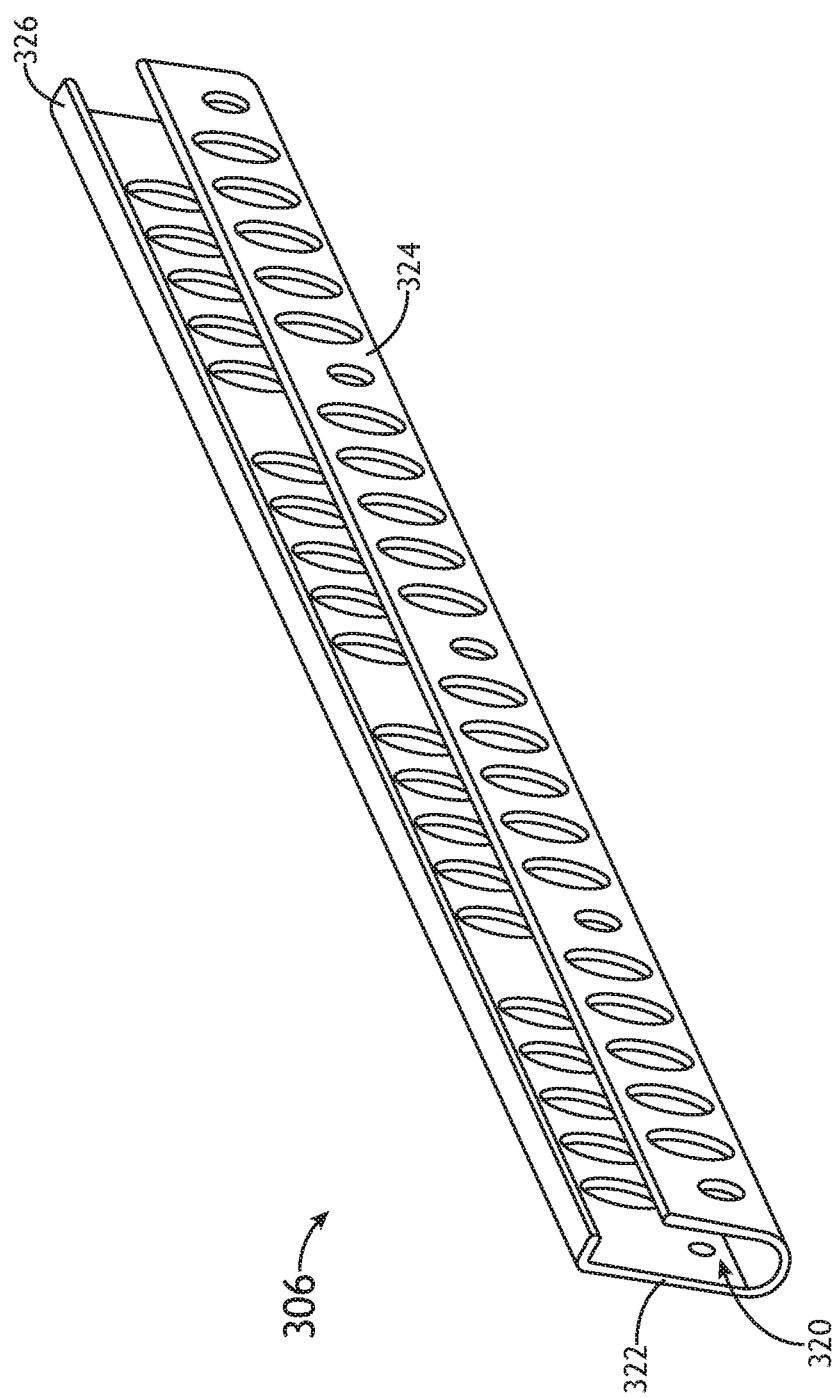
FIG. 3B illustrates a perspective view of a channel structure of an upholstery cover retention assembly.
Figure 3C:
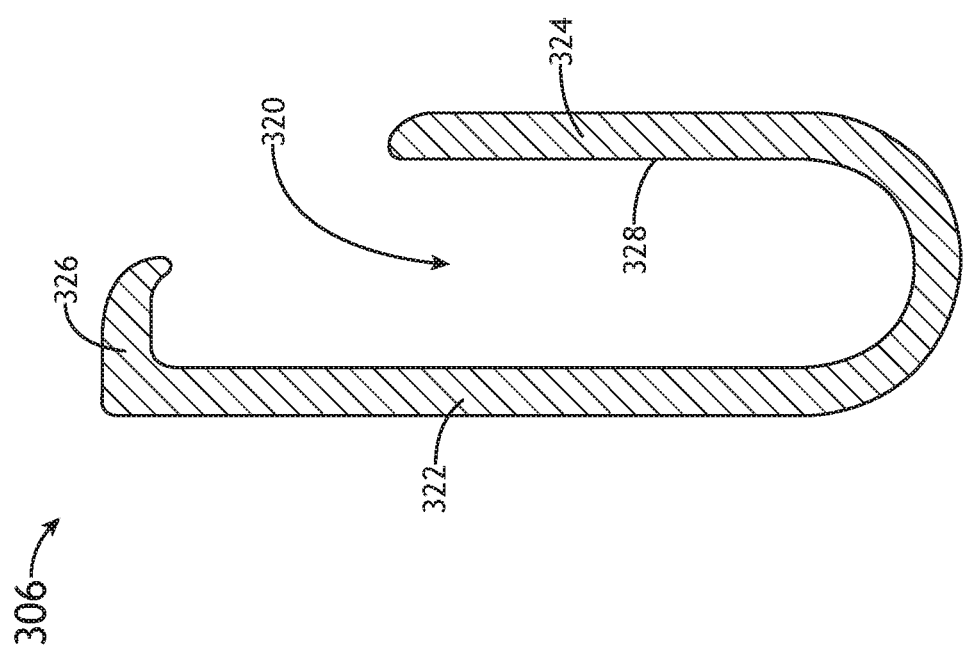
FIG. 3C illustrates a cross-sectional view of a channel structure of an upholstery cover retention assembly.

FIG. 3B illustrates a perspective view of the channel structure 306 of the upholstery cover retention assembly 300. FIG. 3C illustrates a cross-sectional view of the channel structure 306 of the upholstery cover retention assembly 300.

As shown in FIGS. 3B and 3C, the channel structure 306 may include a "U" shaped channel 320 defined by a peripheral wall 322 and a securement wall 324, wherein the securement wall 324 includes an inner surface 328. The channel structure 306 may further include a channel lip 326 extending from the peripheral wall 322 of the channel structure 306 towards the channel 320. The channel structure 306 may be configured to receive and secure an assembled edge 203 of a dress cover assembly 201. In this regard, the channel structure 306 may be fabricated to a particular length which substantially corresponds to a length of an assembled edge 203 and/or a length of a groove 313 formed along the interface of an upholstered article 304 and a bezel 308 (e.g., groove along perimeter of display monitor bezel 108 in FIG. 1B).

As shown in FIG. 3A, the peripheral wall 322 of the channel structure 306 may be coupled to the peripheral surface 314 of the upholstered article 304. A dress cover assembly 201 including a dress cover 202 may be configured to cover the upholstered surface 310. An assembled edge 203 of the dress cover assembly 201 may be configured to be inserted within a groove opening 330 of the groove 313 into the channel 320 of the channel structure 306. The channel structure 306 may then be configured to secure the assembled edge 203 within the channel structure 306 against external outside forces (e.g., pulling on the dress cover 201, a passenger sitting on the seat structure 104 resulting in an outside force).

For example, a passenger sitting on the seat structure 104 may result in a "pulling" force pulling the dress cover 202 to the left, as shown in FIG. 3A. In response to this outside force, the securement portion 205 of the assembled edge 203 may engage the inner surface 328 of the securement wall 324 of the channel structure 306, as shown in FIG. 3A. Additionally, the catch portion 207 may engage the channel lip 326 of the channel structure 306. Taken together, the engagement of the securement wall 324 and the channel lip 326 may serve to secure the assembled edge 203 within the groove 313 and channel structure 306 and resist the outside force, thereby removably "locking" the dress cover assembly 201 in place until such time that the dress cover assembly 201 is to be removed for cleaning or maintenance.

It is noted herein that the upholstery cover retention assembly 300 exhibits several shortfalls and drawbacks. First, the multiple surfaces and features of the channel structure 306 increase the fabrication complexity and manufacturing costs of the channel structure 306 and overall upholstery cover retention assembly 300. Additionally, the relatively large channel structure 306 adds unnecessary weight to the overall weight of the aircraft. Secondly, the complexity of the channel structure 306 requires that the channel structure 306 and the upholstered article 304 be manufactured separately, then coupled together. Separate fabrication processes for the channel structure 306 and the upholstered article 304 increase fabrication time and energy, as well as increase manufacturing costs. Furthermore, the shape and orientation of the channel structure 306 within the groove 313 may make installation and removal of the dress cover assembly 201 more difficult. Finally, the orientation of the dress cover 202 into the groove opening 330 against the inner surface 328 of the channel structure 306 may result in "openings" or "gaps" forming between the dress cover 202 and the bezel surface 312 when an outside force is applied, thereby leading to a less pleasing aesthetic appearance.

Accordingly, embodiments of the present disclosure are directed to an upholstery cover retention assembly 200 configured to address one or more of the shortfalls of the upholstery cover retention assembly 300 identified above. The upholstery cover retention assembly 200 may be further understood with reference to FIGS. 4A-4D.

Figure 4A:
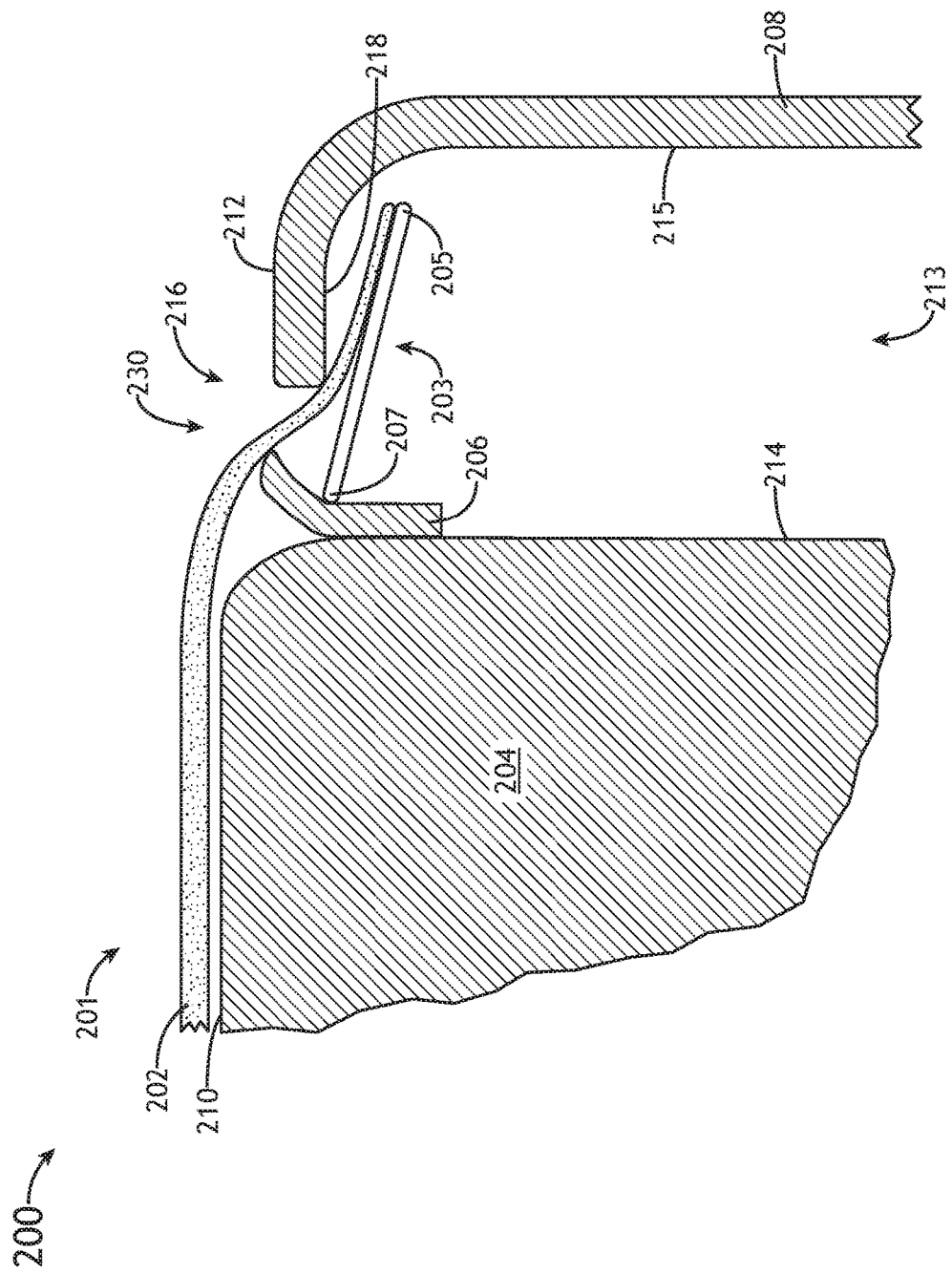
FIG. 4A illustrates a cross-sectional view of an upholstery cover retention assembly, in accordance with one or more embodiments of the present disclosure.

FIG. 4A illustrates a cross-sectional view of an upholstery cover retention assembly 200, in accordance with one or more embodiments of the present disclosure. FIG. 4B illustrates a perspective view of an upholstery cover retention assembly 200, in accordance with one or more embodiments of the present disclosure. As noted previously herein with respect to FIG. 3A, FIG. 4A may illustrate a cross-sectional view of an interface between an upholstered surface 110

(e.g., upholstered surface 210) and a bezel surface 112 (e.g., bezel surface 212) of an aircraft passenger seat 101.

In embodiments, the upholstery cover retention assembly 200 may include an upholstered article 204, a retention flange 206, and a bezel 208. In embodiments, the upholstered article 204 includes one or more upholstered surfaces 210 configured to be at least partially covered by a dress cover 202 of a dress cover assembly 201.

The bezel 208 may include any bezel known in the art including, but not limited to, a display monitor bezel 108 (FIG. 1B). The bezel 208 may include a bezel lip 216 extending from the bezel 208 away from an inner bezel surface 215 towards/proximate to the upholstered article 204. The bezel lip 216 may include a lower bezel surface 218 and a distal tip/surface. In embodiments, the upholstered article 204 and the bezel 208 are disposed proximate and/or adjacent to one another such that a groove 213 is formed between the upholstered article 204 and the bezel 208. For example, a groove 213 may be at least partially defined by a peripheral surface 214 of the upholstered article 204 and the inner surface 215 of the bezel 208. In embodiments, the upholstered article 204 may be disposed proximate and/or adjacent to a bezel 208. For example, the upholstered article 204 may be disposed proximate and/or adjacent to a bezel 208 a selected distance such that a distal edge of the bezel lip 216 is spaced a selected distance from the peripheral surface 214 of the upholstered article 204. By way of another example, the upholstered article 204 may be disposed proximate and/or adjacent to a bezel 208 a selected distance such the groove 213 exhibits a selected width.

In embodiments, the upholstery cover retention assembly 200 may further include a retention flange 206 coupled to a peripheral surface 214 of the upholstered article 204 within the groove 213. For example, as shown in FIG. 4A, the retention flange 206 may be coupled to the peripheral surface 214 of the upholstered article 204. The retention flange 206 may be further understood with reference to FIG. 4C.

Figure 4C:
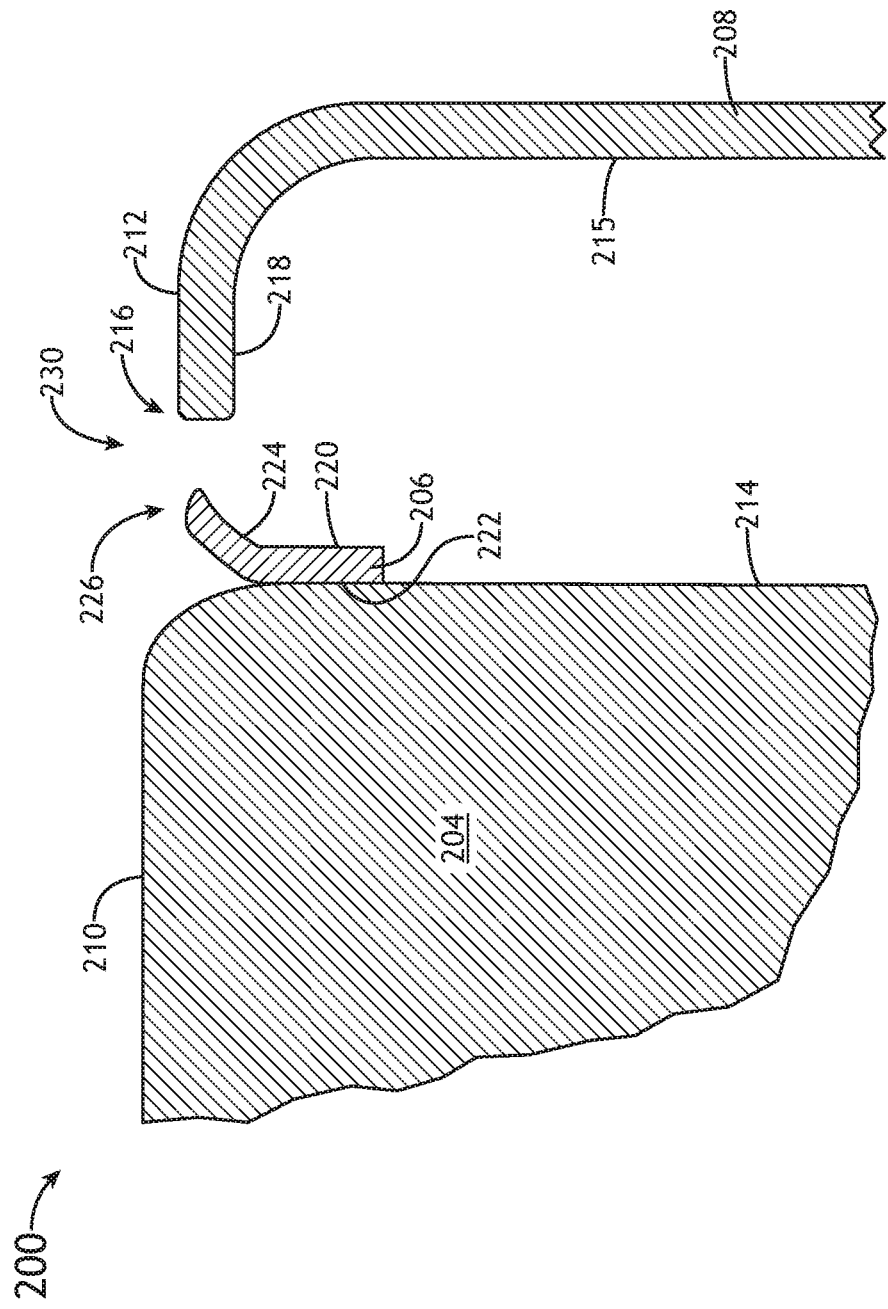
FIG. 4C illustrates a cross-sectional view of a retention flange within an upholstery cover retention assembly, in accordance with one or more embodiments of the present disclosure.

FIG. 4C illustrates a cross-sectional view of a retention flange 206 within an upholstery cover retention assembly 200, in accordance with one or more embodiments of the present disclosure.

In embodiments, the retention flange 206 may include an inner surface 220, an outer surface 222, and a lower engagement surface 224. The retention flange 206 may be coupled to the peripheral surface 214 of the upholstered article 208 via the outer surface 222 of the retention flange 206. The retention flange 206 may be coupled to the upholstered article 204 using any techniques known in the art including, but not limited to, mechanical fasteners (e.g., bolts, rivets), adhesives, welding, soldering, chemical adhesion, and the like. Additionally, the retention flange 206 may be fabricated using any fabrication techniques known in the art including, but not limited to, thermoforming processes, extrusion processes, injection molding processes, and the like.

The retention flange 206 may be coupled to the upholstered surface 210 such that the retention flange 206 extends from the peripheral surface 214 of the upholstered article 204 towards the bezel 208 and/or the bezel lip 216. In some embodiments, the retention flange 206 may include a curved convex retention flange 206. For example, the retention flange 206 may include curved convex retention flange 206 such that the lower engagement surface 224 of the retention flange exhibits a curved convex shape, as shown in FIG. 4C. In additional and/or alternative embodiments, the retention flange 206 may include a planar retention flange, wherein the lower engagement surface 224 includes a substantially planar surface disposed at a defined offset angle relative to the peripheral surface 214. In some embodiments, the retention flange 206 may be coupled to the upholstered article 204 at a selected location along the peripheral surface 214 such that a distal tip 226 and/or distal surface 226 of the retention flange 206 is positioned approximately parallel to the bezel lip 216 relative to a lateral plane parallel to the upholstered surface 210 and/or the bezel surface 212.

In additional and/or alternative embodiments, the retention flange 206 may be coupled to the upholstered article 204 such that the distal tip 226/distal surface 226 may be separated from the distal edge of the bezel lip 216 by a selected lateral distance. In this regard, the retention flange 206 may be coupled to the upholstered article 204 such that the groove opening 230 exhibits a selected width, wherein the width of the groove opening 230 is defined as the distance between the distal tip 226/distal surface 226 of the retention flange 206 and the distal edge of the bezel lip 216.

As shown in FIG. 4A, the dress cover assembly 201 including a dress cover 202 may be configured to cover at least a portion of the upholstered surface 210. An assembled edge 203 of the dress cover assembly 201 may be configured to be inserted within the groove opening 230 into the groove 213. In embodiments, the retention flange 206 and/or the bezel lip 216 are configured to secure the assembled edge 203 of the dress cover assembly 201 within the groove 213. In embodiments, the assembled edge 203 is configured to be removably secured within the groove 213 when an outside force is applied to the dress cover assembly 201 by engaging the lower engagement surface 224 of the retention flange 206 and a lower surface 218 of the bezel lip 216 with the assembled edge 203.

For example, the assembled edge 203 of the dress cover assembly 201 may be disposed within the groove 213. A passenger sitting on the seat structure 104 or a stretching of the dress cover assembly 201 itself may result in a "pulling" force pulling the dress cover 202 to the left, as shown in FIG. 4A. In response to this outside force, the catch portion 207 of the assembled edge 203 may engage the lower engagement surface 224 of the retention flange 206. Additionally, the securement portion 205 of the assembled edge 203 may also engage the lower surface 218 of the bezel lip 216. In some embodiments, engagement of the lower engagement surface 224 of the retention flange 206 with the catch portion 207 of the assembled edge 203 may result in an upward force acting on the securement portion 205 of the assembled edge 203, thereby causing engagement of the lower surface 218 with the securement portion 205. In this regard, the assembled edge 203 may be configured to engage the lower surface 218 of the bezel lip 216 with the securement portion 205 of the assembled edge 203 in response to engagement of the lower engagement surface 224 of the retention flange 206 with the catch portion 207 of the assembled edge 203.

In some embodiments, the retention flange 206 may include one or more structures configured to increase engagement with the lower engagement surface 224 and/or prevent the catch portion 207 from inadvertently slipping or disengaging with the retention flange 206. For example, in some embodiments, the retention flange 206 may include a knob, bulb, projection, or other structure at the distal tip 226 of the retention flange 206 to prevent the catch portion 207 from inadvertently slipping off the retention flange 206. By way of another example, the lower engagement surface 224 may include one or more detents, tabs, or projections configured to increase engagement between the lower engagement surface 224 and the catch portion 207.

It is noted herein that outside forces acting upon the dress cover 202 and/or dress cover assembly 201 may result in increased engagement of the assembled edge 203 within the groove 213. For example, an outside force acting upon the dress cover 202 to the left in FIG. 4A may result in a net upwards force acting upon the securement portion 205 of the assembled edge 203. The net upwards force may thereby cause the assembled edge 203 to engage the lower surface 218 of the bezel lip 216 such that the dress cover 202 of the dress cover assembly 201 is substantially parallel with the lower surface 218 of the bezel lip 216. For instance, the assembled edge 203 may engage the lower surface 218 of the bezel lip 216 such that the dress cover 202 is disposed upon, and substantially parallel to, the lower surface 218.

In embodiments, engagement with the lower engagement surface 224 of the retention flange 206 and/or engagement of the lower surface 218 of the bezel lip 216 with the assembled edge 203 may serve to secure the assembled edge 203 within the groove 213 and resist the outside forces from displacing the assembled edge 203 from the groove 213. In this regard, the upholstery cover retention assembly 200 may be configured removably "lock" the dress cover assembly 201 in place until such time that the dress cover assembly 201 is to be removed for cleaning or maintenance.

It is noted herein that the upholstery cover retention assembly 200 cures many of the shortfalls of the conventional upholstery cover retention assembly 300 illustrated in FIGS. 3A-3C. First, the simplified design of the retention flange 206 compared to the channel structure 306 simplifies the fabrication process and reduces time, energy, and resources required for fabrication. Additionally, the reduced form factor of the retention flange 206 significantly simplifies the overall complexity and weight of the upholstery cover retention assembly 200, thereby reducing the overall weight of an aircraft. Additionally, it has been found that the structural characteristics of the retention flange 206 within the upholstery cover retention assembly 200 may allow for easier installation and removal of the dress cover assembly 201. Finally, because the assembled edge 203 engages directly with the lower surface 218 of the bezel lip 216, with the dress cover 202 even being disposed upon the bezel lip 216, "openings" or "gaps" do not form between the dress cover 202 and the bezel surface 212 when an outside force is applied, as could be the case with the upholstery cover retention assembly 300.

Figure 4D:
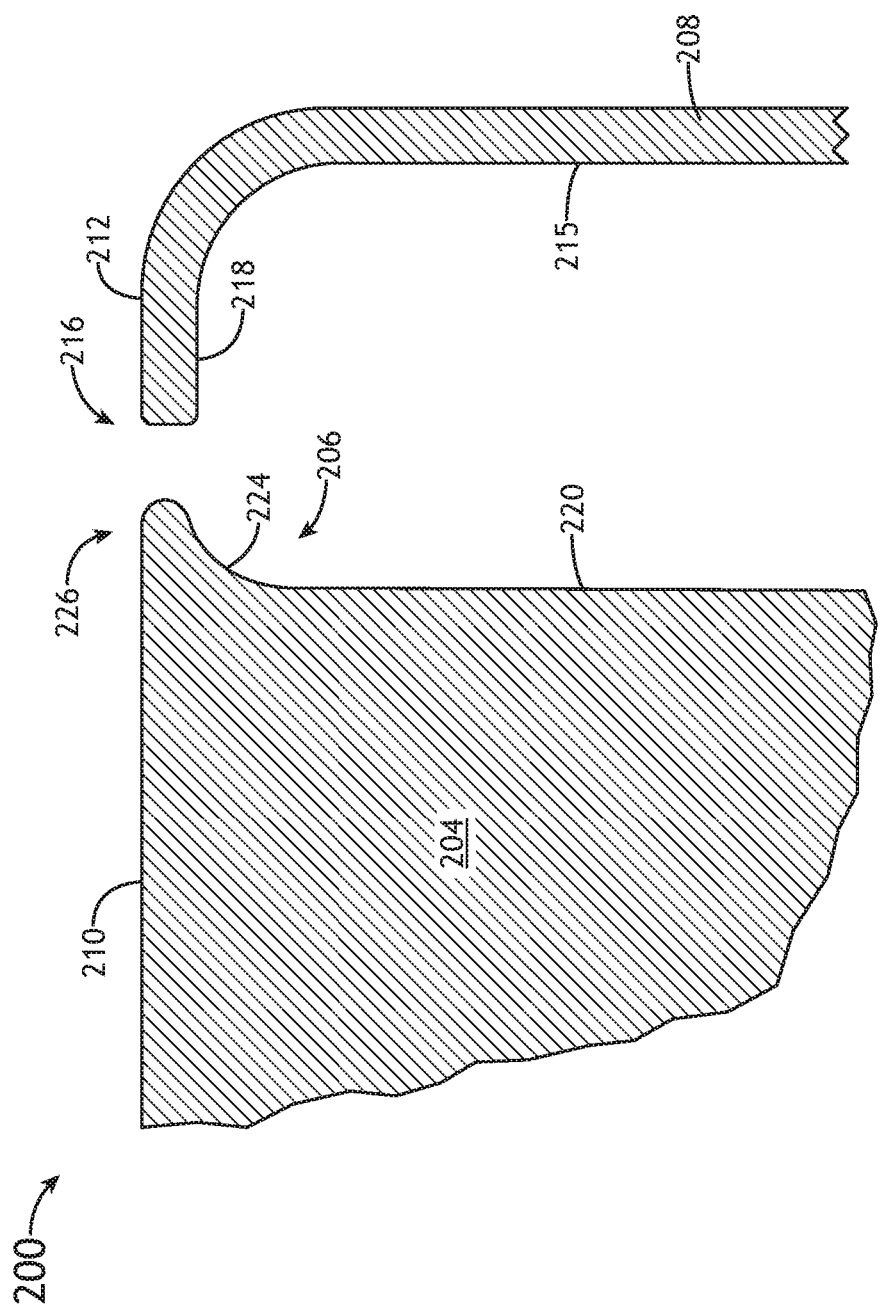
FIG. 4D illustrates a cross-sectional view of an upholstery cover retention assembly, in accordance with one or more embodiments of the present disclosure.

FIG. 4D illustrates a cross-sectional view of an upholstery cover retention assembly 400, in accordance with one or more embodiments of the present disclosure.

In some embodiments, the upholstered article 204 and the retention flange 206 may include a single upholstered article/retention flange structure or assembly. In this regard, the upholstered article 204 may be fabricated/manufactured to include the retention flange 206 such that the retention flange 206 is a component of the upholstered article 204. For example, as shown in FIG. 4D, the upholstered article 204 may be fabricated to include a retention flange 206 extending from the upholstered article 204. It is noted herein that fabricating the upholstered article 204 and the retention flange 206 as a single structure/assembly may further simplify fabrication processes required for the upholstery cover retention assembly 200, and provide increased strength and durability to the retention flange 206. In embodiments where the upholstered article 204 and retention flange 206 are fabricated as a single structure/assembly, the upholstered article 204 and retention flange 206 structure/assembly may be fabricated by any fabrication processes known in the art including, but not limited to, thermoforming processes, injection molding processes, extrusion processes, and the like.

Figure 5A:
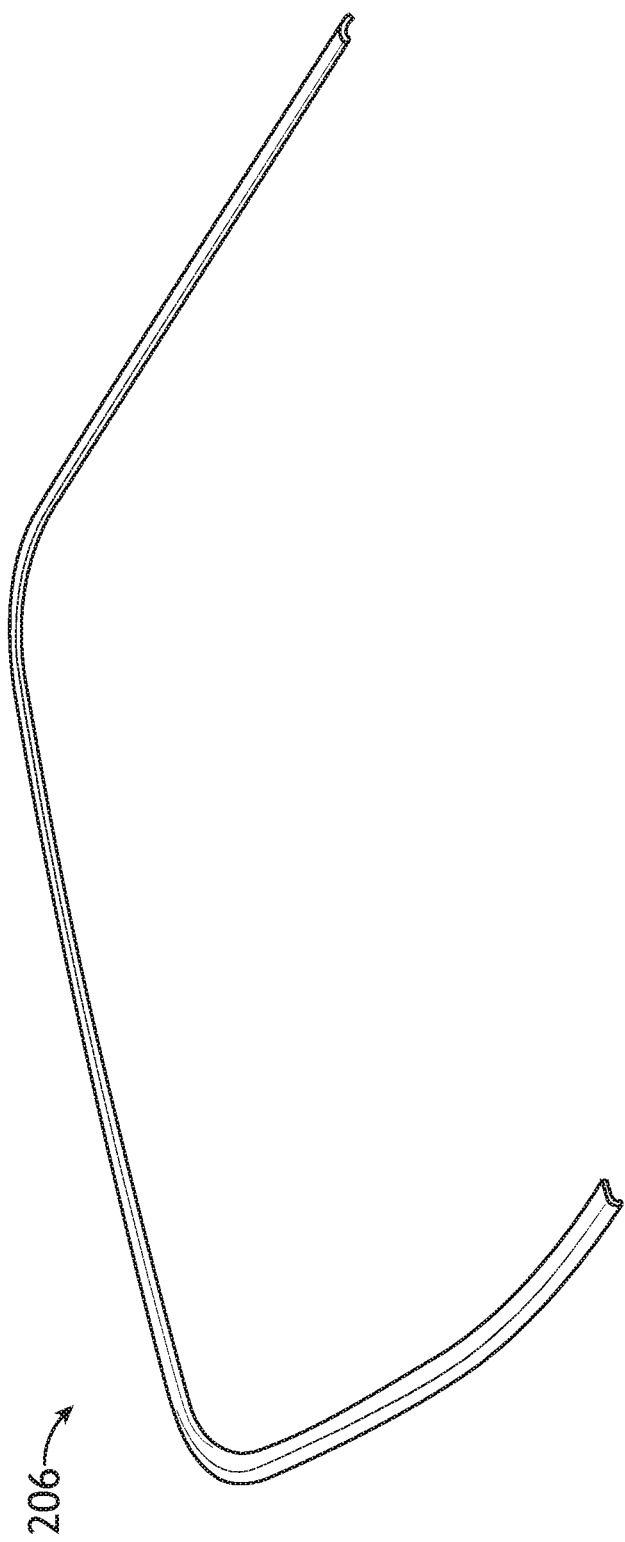
FIG. 5A illustrates a front elevation view of a retention flange of an upholstery cover retention assembly, in accordance with one or more embodiments of the present disclosure.
Figure 5B:
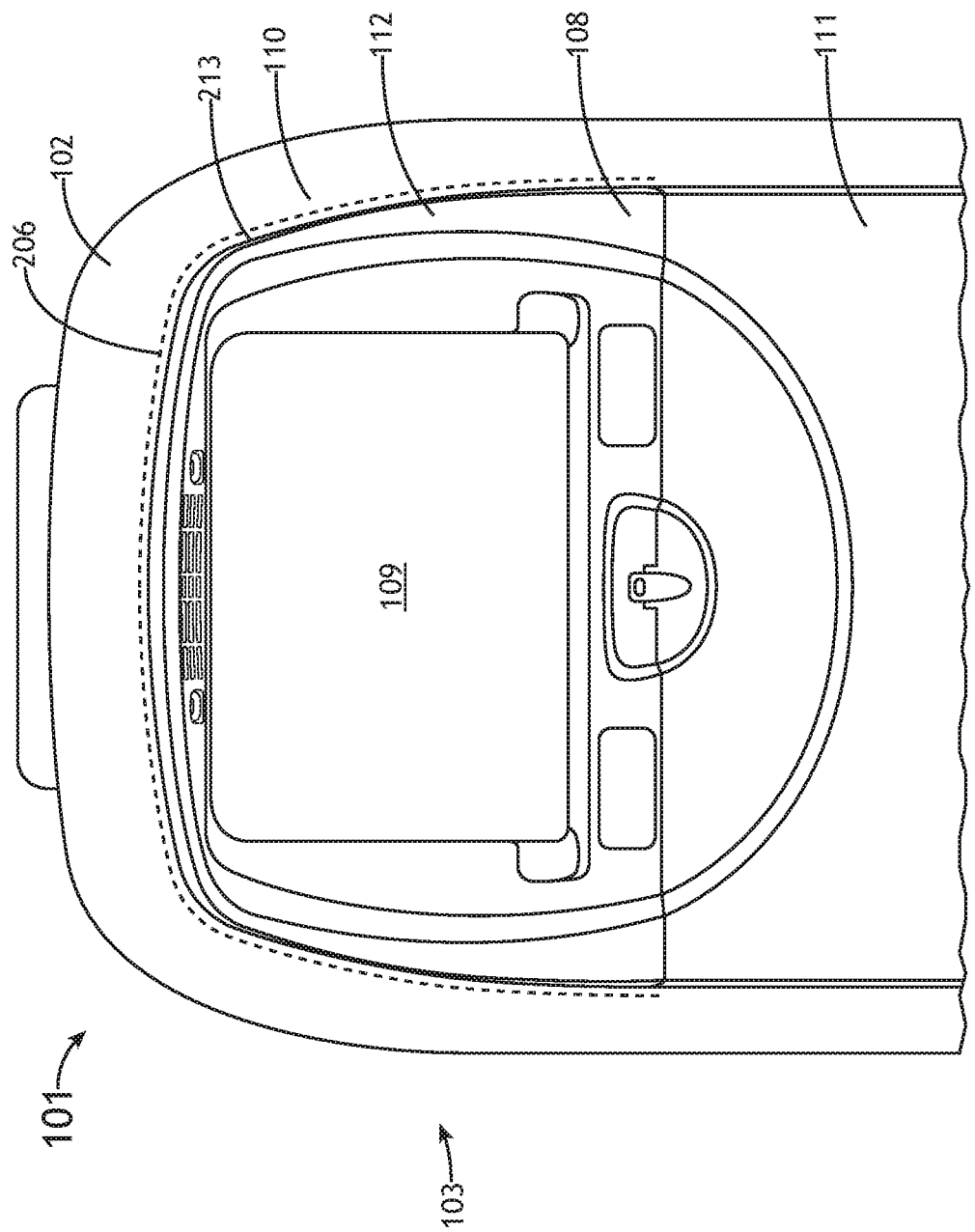
FIG. 5B illustrates a rear elevation view of an aircraft passenger seat including a retention flange of an upholstery cover retention assembly, in accordance with one or more embodiments of the present disclosure.

FIG. 5A illustrates a front elevation view of a retention flange 206 of an upholstery cover retention assembly 200, in accordance with one or more embodiments of the present disclosure. FIG. 5B illustrates a rear elevation view of an aircraft passenger seat 101 including a retention flange 206 of an upholstery cover retention assembly 200, in accordance with one or more embodiments of the present disclosure.

In embodiments, a retention flange 206 may be fabricated such that it conforms to an outer perimeter of a bezel 208 and/or groove 213 at an interface of an upholstered surface 210 and a bezel surface 212. For example, as shown in FIGS. 5A-5B, a retention flange 206 may be fabricated such that it substantially conforms to an outer perimeter of a display monitor bezel 208. In this regard, the retention flange 206 may be fabricated to a particular length which substantially corresponds to a length of an assembled edge 203 and/or a length of a groove 213 formed along the interface of an upholstered article 204 and a bezel 208 (e.g., groove along perimeter of display monitor bezel 108). The retention flange 206 may then be coupled/affixed to the seatback 103 proximate to the outer perimeter of the display monitor bezel 206 in order to secure the dress cover 202 within a groove 213 formed between the upholstered surface 110 (e.g., upholstered surface 210) of the seatback 103 and the bezel surface 112 (e.g., bezel surface 212) of the display monitor bezel 108, as shown in FIG. 5B.

Although example embodiments of the present disclosure are shown and described in an aircraft environment, the inventive concepts of the present disclosure may be configured to operate in alternative and/or additional contexts, unless noted otherwise herein. In this regard, the upholstery cover retention assembly 200 may instead may be installed and/or configured or dimensioned to fit on any seat or other upholstered article of any type of vehicle known in the art that has seats. For example, the upholstery cover retention assembly 200 may be implemented into the seats of any air, land, or water-based personal equipment or vehicle; any air, land, or water-based commercial equipment or vehicle (e.g., busses, trains, subways); any air, land, or water-based military equipment or vehicle known in the art. Additionally, it is noted herein the upholstery cover retention assembly 200 of the present disclosure may be installed and/or configured or dimensioned to fit on any seat or upholstered article within a home or a business. For example, the upholstery cover retention assembly 200 may be installed and/or configured or dimensioned to fit on a seat in auditoriums, movie theatres, sports venues (e.g., baseball parks, arenas, or other venues having installed seats, or the like), where the seats are arranged in front of one other. Therefore, the above description should not be interpreted as a limitation on the disclosure but merely an illustration.

It is further noted herein that, where the environment includes an aircraft environment, it is noted herein the embodiments of aircraft passenger seat apparatus 100 may be configured in accordance with avionics guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An upholstery cover retention assembly, comprising:
an upholstered article including an upholstered surface;
a bezel including a bezel lip proximate to the upholstered article;
a retention flange disposed on a peripheral surface of the upholstered article; and
a dress cover assembly comprising:
a dress cover configured to at least partially cover the upholstered surface of the upholstered article; and
an assembled edge configured to be disposed within a groove formed between the peripheral surface of the upholstered article and the bezel, the assembled edge including a securement portion and a catch portion,
wherein the assembled edge is configured to be secured within the groove by engaging a lower engagement surface of the retention flange and a lower surface of the bezel lip with the assembled edge, wherein the assembled edge is configured to engage the lower surface of the bezel lip with the securement portion of the assembled edge, wherein an outside force acting upon the dress cover assembly causes the assembled edge to engage the lower surface of the bezel lip such that the dress cover of the dress cover assembly is substantially parallel with the lower surface of the bezel lip.

2. The upholstery cover retention assembly of claim 1, wherein the assembled edge is configured to engage the lower engagement surface of the retention flange with the catch portion of the assembled edge.

3. The upholstery cover retention assembly of claim 1, wherein the assembled edge is configured to engage the lower surface of the bezel lip with the securement portion of the assembled edge in response to engagement of the lower engagement surface of the retention flange with the catch portion of the assembled edge.

4. The upholstery cover retention assembly of claim 1, wherein the bezel lip extends from the bezel towards the upholstered article, and wherein the retention flange extends from the peripheral surface towards the bezel.

5. The upholstery cover retention assembly of claim 1, wherein the assembled edge is configured to resist outside forces in order to retain the dress cover assembly within the groove.

6. The upholstery cover retention assembly of claim 1, wherein the assembled edge comprises an edge attachment article secured along at least a portion of a perimeter of the dress cover.

7. The upholstery cover retention assembly of claim 6, wherein the securement portion comprises a distal edge of the assembled edge, and wherein the catch portion comprises a proximate edge of the edge attachment article.

8. The upholstery cover retention assembly of claim 1, wherein the upholstered article is fabricated to include the retention flange such that the retention flange comprises a component of the upholstered article.

9. The upholstery cover retention assembly of claim 8, wherein the upholstered article and retention flange are fabricated by at least one of a thermoforming process or an extrusion process.

10. The upholstery cover retention assembly of claim 1, wherein the upholstered article comprises a seatback of an aircraft seat.

11. The upholstery cover retention assembly of claim 1, wherein the bezel comprises a display monitor bezel of an aircraft seat.

12. The upholstery cover retention assembly of claim 1, wherein the retention flange comprises a curved convex retention flange.

13. An upholstery cover retention assembly, comprising:
an upholstered article including an upholstered surface;
a bezel including a bezel lip proximate to the upholstered article;
a retention flange disposed on a peripheral surface of the upholstered article; and
a dress cover assembly comprising:
a dress cover configured to at least partially cover the upholstered surface of the upholstered article; and
an assembled edge configured to be disposed within a groove formed between the peripheral surface of the upholstered article and the bezel, the assembled edge including a securement portion and a catch portion,
wherein the assembled edge is configured to be secured within the groove by engaging a lower engagement surface of the retention flange and a lower surface of the bezel lip with the assembled edge, wherein the assembled edge comprises an edge attachment article secured along at least a portion of a perimeter of the dress cover, the securement portion comprises a distal edge of the assembled edge, and wherein the catch portion comprises a proximate edge of the edge attachment article.

14. The upholstery cover retention assembly of claim 13, wherein the assembled edge is configured to engage the lower engagement surface of the retention flange with the catch portion of the assembled edge.

15. The upholstery cover retention assembly of claim 13, wherein the bezel lip extends from the bezel towards the upholstered article, and wherein the retention flange extends from the peripheral surface towards the bezel.

16. The upholstery cover retention assembly of claim 13, wherein the assembled edge is configured to resist outside forces in order to retain the dress cover assembly within the groove.

17. The upholstery cover retention assembly of claim 13, wherein the upholstered article is fabricated to include the retention flange such that the retention flange comprises a component of the upholstered article.

18. The upholstery cover retention assembly of claim 17, wherein the upholstered article and retention flange are fabricated by at least one of a thermoforming process or an extrusion process.

19. The upholstery cover retention assembly of claim 13, wherein the upholstered article comprises a seatback of an aircraft seat.

20. The upholstery cover retention assembly of claim 13, wherein the bezel comprises a display monitor bezel of an aircraft seat.

* * * * *